US009005359B2

(12) United States Patent
Wampler et al.

(10) Patent No.: US 9,005,359 B2
(45) Date of Patent: Apr. 14, 2015

(54) POLYSULFIDE TREATMENT OF CARBON BLACK FILLER AND ELASTOMERIC COMPOSITIONS WITH POLYSULFIDE TREATED CARBON BLACK

(71) Applicant: Sid Richardson Carbon, Ltd., Fort Worth, TX (US)

(72) Inventors: Wesley Wampler, Hudson Oaks, TX (US); Borje Michael Jacobsson, Fort Worth, TX (US); Leszek Nikiel, Fort Worth, TX (US); Peter D. Cameron, Haltom City, TX (US); Joel Neilsen, Broadview Heights, OH (US)

(73) Assignee: Sid Richardson Carbon, Ltd., Fort Worth, TX (US)

( * ) Notice: Subject to any disclaimer, the term of this patent is extended or adjusted under 35 U.S.C. 154(b) by 70 days.

(21) Appl. No.: 13/827,599

(22) Filed: Mar. 14, 2013

(65) Prior Publication Data

US 2013/0340651 A1    Dec. 26, 2013

Related U.S. Application Data

(60) Provisional application No. 61/662,598, filed on Jun. 21, 2012.

(51) Int. Cl.
*C08K 3/00* (2006.01)
*C09C 1/56* (2006.01)
*C09C 1/58* (2006.01)
*C08K 9/02* (2006.01)

(52) U.S. Cl.
CPC ........................................ *C08K 9/02* (2013.01)

(58) Field of Classification Search
CPC .............. C09C 1/56; C09C 1/565; C09C 1/58
See application file for complete search history.

(56) References Cited

U.S. PATENT DOCUMENTS

| | | | |
|---|---|---|---|
| 2,811,502 A | 10/1957 | Gessler et al. | |
| 3,340,081 A | 9/1967 | Teter | |
| 3,442,679 A | 5/1969 | Rivin et al. | |
| 3,528,840 A | 9/1970 | Aboytes | |
| 4,269,250 A | 5/1981 | Harrison | |
| 5,159,009 A | † 10/1992 | Wolff | |
| 5,654,357 A | 8/1997 | Menashi et al. | |
| 6,197,274 B1 | 3/2001 | Mahmud et al. | |
| 6,294,683 B1 | 9/2001 | Johnson et al. | |
| 6,794,428 B2 | † 9/2004 | Burrington | |

(Continued)

FOREIGN PATENT DOCUMENTS

| | | |
|---|---|---|
| CN | 101856619 A1 † | 10/2010 |
| WO | 2011095986 A2 | 8/2011 |

(Continued)

*Primary Examiner* — Pegah Parvini
(74) *Attorney, Agent, or Firm* — Fraser Clemens Martin & Miller LLC; Jacob M. Ward

(57) ABSTRACT

A chemically treated carbon black product is provided, which includes a pellet having an agglomerated mass of carbon black aggregates densified in a generally spheroidal form. The carbon black aggregates have polysulfide adsorbed on surfaces thereof. The polysulfide is thereby distributed throughout the pellet. Elastomeric compositions containing the chemically treated carbon black are also provided, and exhibit a reduction in hysteresis and equivalent or better abrasion resistance. A method for manufacturing the treated carbon black product is also disclosed.

11 Claims, 4 Drawing Sheets

(56) References Cited

U.S. PATENT DOCUMENTS

| | | |
|---|---|---|
| 7,968,635 B2 | 6/2011 | York et al. |
| 8,263,525 B1 * | 9/2012 | Skandan et al. ............. 502/400 |
| 2001/0036994 A1 † | 11/2001 | Bergemann |
| 2002/0111413 A1 * | 8/2002 | Lopez-Serrano Ramos et al. ............. 524/495 |
| 2003/0158325 A1 * | 8/2003 | Magnus et al. ............ 524/575.5 |
| 2004/0192852 A1 * | 9/2004 | Stieber et al. ............. 525/266 |
| 2004/0249020 A1 | 12/2004 | Sandstrom et al. |
| 2006/0094831 A1 | 5/2006 | Choi et al. |
| 2007/0161756 A1 | 7/2007 | Fukushima et al. |
| 2008/0161463 A1 | 7/2008 | Cruse et al. |
| 2009/0081515 A1 | 3/2009 | Shibata et al. |

FOREIGN PATENT DOCUMENTS

| | | |
|---|---|---|
| WO | 2012031183 A2 † | 3/2012 |
| WO | 2013098838 A2 | 7/2013 |

\* cited by examiner
† cited by third party

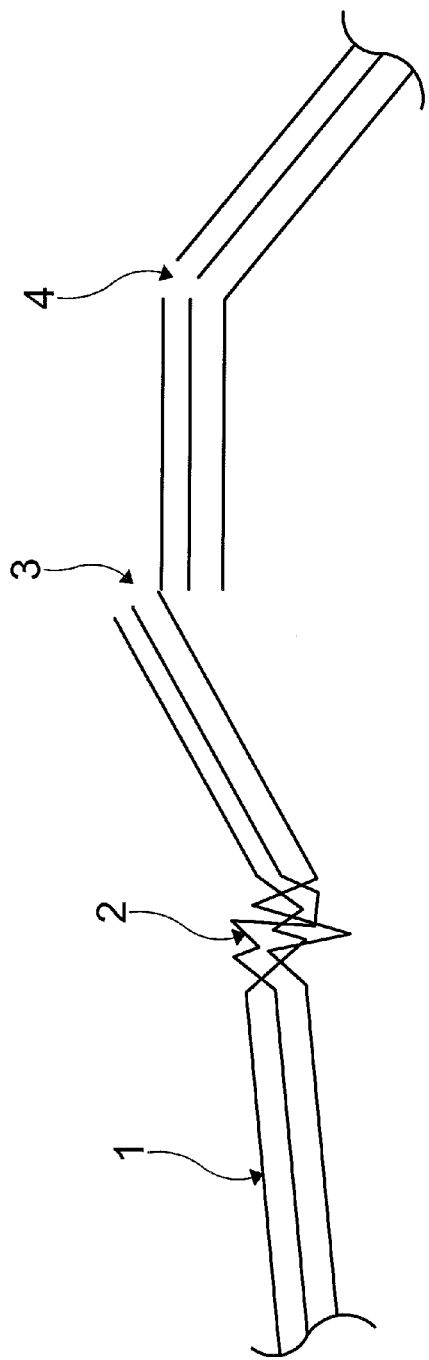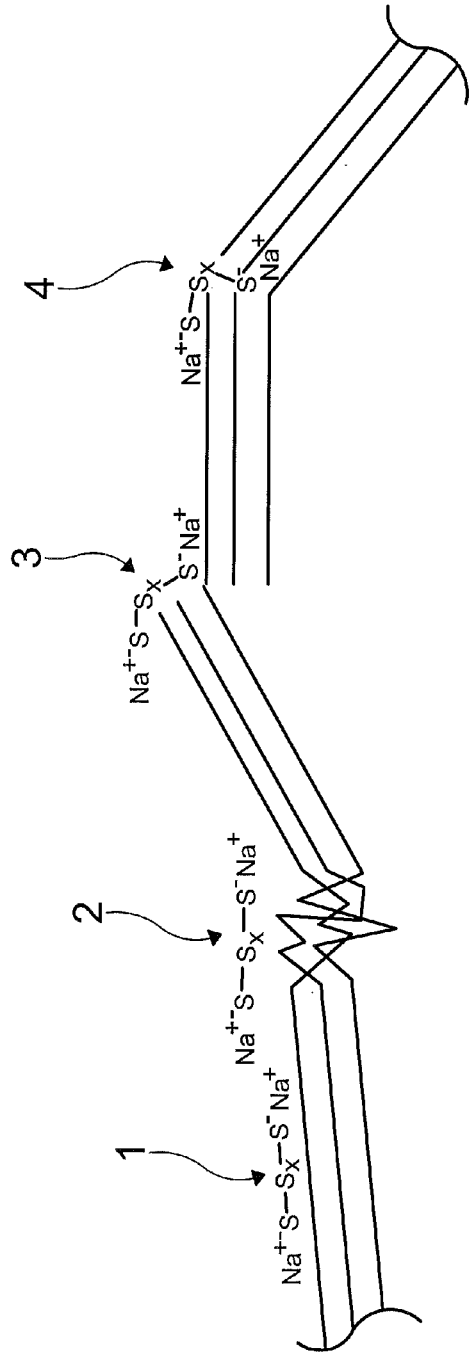

POLYSULFIDE TREATMENT OF CARBON BLACK FILLER AND ELASTOMERIC COMPOSITIONS WITH POLYSULFIDE TREATED CARBON BLACK

CROSS-REFERENCE TO RELATED APPLICATIONS

This application claims the benefit of U.S. Provisional Application No. 61/662,598 filed on Jun. 21, 2012. The entire disclosure of the above application is hereby incorporated herein by reference.

FIELD OF THE INVENTION

The present disclosure relates to reinforcing fillers for rubber compounds and, more particularly, to a chemically modified carbon black filler for rubber compounds.

BACKGROUND OF THE INVENTION

Tires and other rubber goods are employed in many applications that require dynamic deformations. Thus, a relative amount of energy that is stored or lost as heat during the deformations, known as "hysteresis", is important in assessing the performance of the rubber product. While the polymer and various ingredients play a significant role in hysteresis, the carbon black is also a very important contributor. Carbon blacks that can impart less energy loss in the form of heat at the same level of reinforcement as similar grade carbon blacks are known as "low hysteresis" carbon blacks.

Increasing energy prices are forcing both consumers and manufacturers to look for better technologies in order to conserve energy, keep costs under control, and preserve as much as possible of non-renewable natural resources. The above statement also applies to tire manufacturers. Development of new, less hysteretic materials for tire applications is one of the important focus areas for each tire manufacturer.

Tires are an integral part of the energy conservation process. Experiments and theoretical calculations have shown that as much as seventy percent of the rolling resistance of a tire originates from the tread region, and the remaining thirty percent from other tire components. Since filled rubber compounds typically contain a significant amount of filler, the filler influence on the compound's hysteresis is considerable.

When developing new fillers such as carbon black for tire applications, one has to be mindful of the many performance parameters affected by the filler as well as many basic functions of the pneumatic tire. The tire must provide load carrying capacity, transmit driving and braking torque, provide steering response, produce cornering forces and minimize road noise and vibrations. In addition, it must resist abrasion, have low rolling resistance and, of course, be durable and safe. Furthermore, the tire has many components which contain different types of rubber compounds to optimize the properties for that specific part of the tire. Typical components of a tire include the tread, sidewall, shoulder, bead, plies, belts, liner and chafer. For the new carbon blacks described herein, we have chosen to simply classify them as tread and non-tread. In designing a new carbon black for any of these components, one has to understand not only its function but also where improvements can be made.

The tread section of a tire is where contact between the road and the vehicle is made. The rubber in this area must be compounded to provide a right balance of wear resistance, heat buildup or hysteresis, and traction. The tread is normally a blend of different synthetic rubbers and/or natural rubber. It also contains carbon black, oil, curatives, antioxidants and additional chemicals for processing and performance optimization. Depending on the application, the balance of wear resistance, hysteresis and traction is modified through the different raw materials with carbon black being one of the most critical components. The new chemically treated tread grade of carbon black presented herein is for applications in which hysteresis and abrasion resistance are given more priority in the balance.

In the non-tread sections of the tire, there is concern about many other performance properties of the rubber compound that affect the tire's durability, ride comfort, handling, etc. The sidewall is the portion of the tire between the beads and the tread that control the ride and offer support. The sidewall is usually compounded to give high flexibility and weather resistance. The shoulder of the tire is the upper portion of the sidewall just below the edge of the tread. The shoulder is critical for tire properties such as cornering and heat development thus the rubber in this section is compounded to optimize these characteristics. The bead is a structure composed of high tensile strength; bronze plated steel wire that is wound to form a continuous strand that is coated with rubber. The bead functions as an anchor for the plies and holds the tire on the rim of the wheel. Each steel wire is encapsulated by a special rubber compound that helps in distributing stresses uniformly among the wires and combines them into a strong flexible component. The carcass plies are rubber coated layers of fabric cord that extend from bead to bead reinforcing the tire. The rubber compound for the plies is spread onto the fabric in an operation known as calendering. The rubber compound for this section is designed to provide little or no shrinkage, tackiness appropriate for the adhesion to the fabric, and proper viscosity so that it can be applied uniformly. The belts are directly under the tread and consist of tire cord (fabric or steel) imbedded into a rubber compound whose function is to restrict or hold the carcass plies and to help resist deformation in the tire footprint. The liner is the innermost layer of rubber. It is a thin layer that prevents the compressed gas inside a tire from diffusing through the various rubber components. This is obviously a special compound that must have low permeability to gases used in various tires but also other properties such as good thermal/oxidative stability and good adhesion to the body stock. The chafer is a narrow strip of yet another rubber compound that protects the cord from the rim and helps distribute flex above the rim.

The point of reiterating all these functional components of a tire is to illustrate that they require many special compounds and that each plays a role in the performance of the tire as a whole. Developing a combination of properties in any part of the tire that leads to an overall improvement in the tire's hysteresis performance is very advantageous and beneficial.

Most of the carbon black used in the tire industry is produced using the furnace process. In the furnace process, the feedstock is incompletely combusted in a reaction to form a very finely divided material composed of aggregates that are the carbon black monounits. These aggregates are typically submicron in size and of very complex structure. The surface of the aggregates may be covered with turbostratic graphitic crystallites and areas of disorganized amorphous carbon.

In order to produce different grades of carbon black, different reactor technology is sometimes employed. As a general rule, tread grade blacks are produced using different reactor design as compared to carcass grades. In addition to specific reactor design, the number and position of oil spraying nozzles, the ratio of air to feedstock and natural gas, as well as the position of the quench water sprays also plays a critical role in setting the carbon black properties (size, surface area, and structure). When carbon black is formed in the reactor, which takes only a few milliseconds, it is in the form of a thick smoke with apparent density of about $10^{-2}$ g/cm$^3$. The remaining production time, which could be up to two hours, is conveying and handling the product in order to prepare the carbon black to be shipped and further processed.

Due to the low density of the products, it is necessary to densify the material. This process is usually achieved through a pelletization. The finished pellets are quasispherical with a diameter in the millimeter range and an apparent density of about 0.35 g/cm$^3$.

Tread grade carbon blacks such as 100- and 200-series, e.g., N134 and N234 tread grade carbon blacks, respectively, are common commercial grades used in the production of tires. While delivering satisfactory performance in many applications, they are not capable of meeting many of the new demands for lower hysteresis blacks. Many grades have been developed to improve hysteresis over these types of grades, but typically there is a tradeoff of properties. For example, wide aggregate size distribution carbon blacks have had some success in achieving lower hysteresis but do so with some loss in treadwear.

There is a continuing need for a carbon black product that provides an improved hysteresis over conventional carbon black products when incorporated into rubber compounds. Desirably, the treated carbon black product provides the improved hysteresis when used in tire tread rubber compounds, without undesirably affecting treadwear of the tire tread rubber compounds.

SUMMARY OF THE INVENTION

In concordance with the instant disclosure, a treated carbon black product that provides an improved hysteresis over conventional carbon black products when incorporated into rubber compounds, and which provides the improved hysteresis when used in tire tread rubber compounds without undesirably affecting treadwear of the tire tread rubber compounds, is surprisingly discovered.

A process for producing a chemically treated carbon black has been developed that can use any water soluble or slightly soluble chemical for treatment of the carbon black. For example, water soluble sodium polysulfide may be added to the carbon black. The chemically treated carbon black may then be mixed into elastomeric compositions to produce compounds with a reduction in hysteresis evidenced by a decrease in loss modulus and tangent delta at either 30° C. or 60° C. and higher % rebound.

In addition, a process is disclosed for optimizing an elastomeric composition such that the chemically treated carbon black, such as with polysulfides, can also give equivalent strength properties in the rubber compounds at the lower hysteresis levels. These filler modifications, along with appropriate compounding strategies, can advantageously lead to an improved balance of performance properties, such as in case of natural rubber where there has heretofore been a great need for an improved type of filler to meet regulatory demands and expectations on fuel efficient tires.

In one embodiment, a treated carbon black product has carbon black aggregates with polysulfide adsorbed on surfaces thereof. The treated carbon black product may be provided in a pelletized form. Each of the pellets includes an agglomerated mass of carbon black aggregates densified in a generally spheroidal shape. The polysulfide is distributed substantially evenly throughout the pellet composed of these aggregates.

In another embodiment, a method for manufacturing a treated carbon black product includes the steps of: providing a quantity of carbon black product prior to pelletization; treating the quantity of carbon black product with an aqueous solution of a polysulfide salt, wherein a polysulfide from the polysulfide salt is adsorbed onto surfaces of the carbon black product; and pelletizing the quantity of treated carbon black product.

In a further embodiment, an elastomeric composition includes a quantity of elastomer, a quantity of treated carbon black product, and a cure package. The quantity of treated carbon black product may be provided in the form of pellets. Each pellet includes an agglomerated mass of carbon black aggregates densified in a generally spheroidal shape. The carbon black aggregates have polysulfide adsorbed on surfaces thereof. The polysulfide is thereby distributed throughout the pellets.

DRAWINGS

The above, as well as other advantages of the present disclosure, will become readily apparent to those skilled in the art from the following detailed description, particularly when considered in the light of the drawings described herein.

FIG. 1 illustrates typical sites on a surface of a carbon black aggregate where adsorption of polysulfide may occur, in a treated carbon black product according to an embodiment of the present disclosure;

FIG. 2 illustrates the surface of the carbon black aggregate shown in FIG. 1, having the polysulfide adsorbed to the surface of the carbon black aggregate, in the treated carbon black product according to one embodiment of the present disclosure;

DETAILED DESCRIPTION OF THE INVENTION

Figure 3:
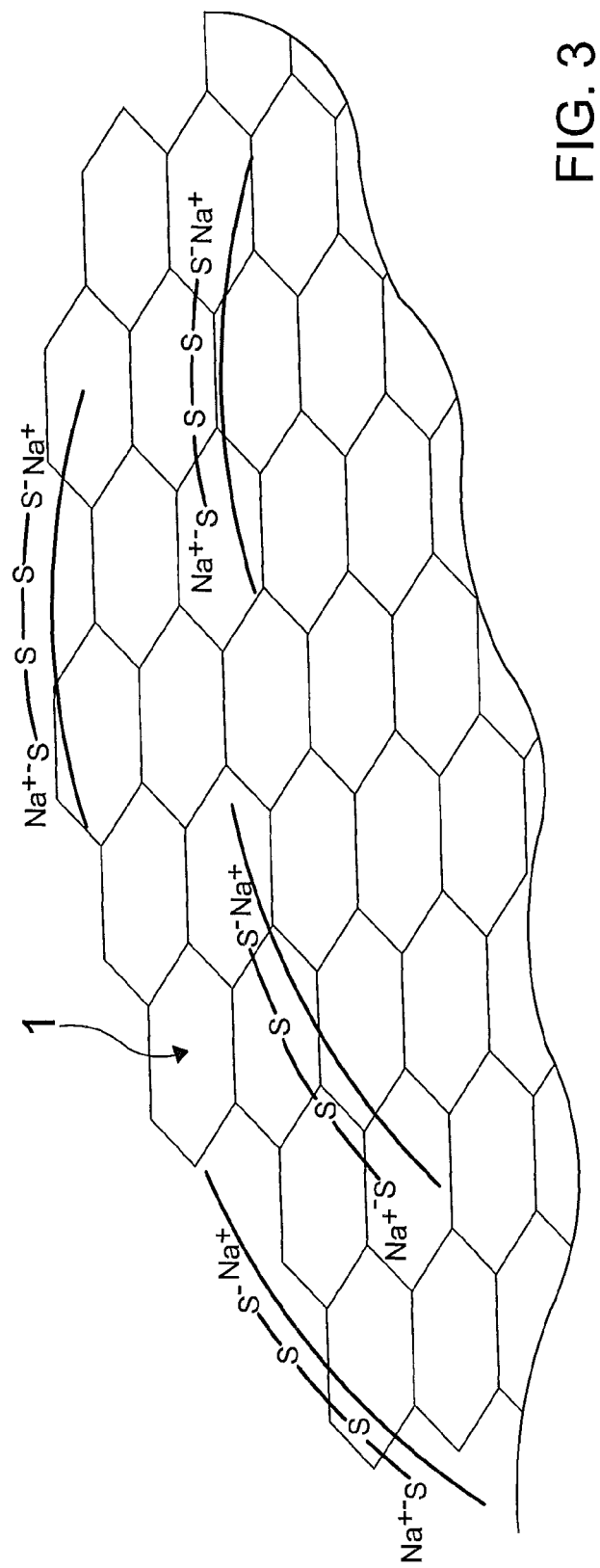
FIG. 3 illustrates a largely graphitic surface of the carbon black aggregate having the polysulfide adsorbed thereon, in a treated carbon black product according to another embodiment of the present disclosure.

The following description is merely exemplary in nature and is not intended to limit the present disclosure, application, or uses. It should also be understood that throughout the drawings, corresponding reference numerals indicate like or corresponding parts and features. In respect of the methods disclosed, the order of the steps presented is exemplary in nature, and thus, is not necessary or critical.

As shown generally in FIGS. 1-5, the present disclosure includes a chemically treated carbon black product. The treated carbon black product has been found to be particularly useful as reinforcing low hysteresis filler in rubber or elastomeric compositions.

The treated carbon black product includes carbon black aggregates having polysulfide adsorbed on surfaces thereof. In a particular embodiment, the carbon black aggregates are in the form of a pellet. The pellet includes an agglomerated mass of the carbon black aggregates densified in a generally spheroidal shape. Where the treated carbon black product is densified in the pellet form, it should be appreciated that the polysulfide is substantially evenly distributed throughout the pellet, although the polysulfide is only adsorbed on the surfaces of the carbon black aggregates forming the monounits of the pellet.

As used herein, the term "adsorbed" means that the polysulfide is, at least in part, adhered as an adsorbate on the surfaces of the adsorbent, the carbon black aggregates. Without being bound to any particular theory, it is believed that the polysulfide is adhered to the surfaces of the carbon black aggregates through at least one of: van der Waals interactions; physical interaction with porous three-dimensional graphitic lattice microstructures of the carbon black aggregates; and covalent and/or ionic or other non-covalent interactions with active species such as oxygen, nitrogen, etc. also found at the surfaces of the carbon black aggregates. Being adsorbed, the polysulfide is located primarily at the surfaces of the carbon black aggregates, and is not believed to absorb within the bulk of the carbon black aggregates themselves.

One of ordinary skill in the art understands that, in addition to reinforcing effects caused by the fractal nature of both carbon black aggregates and filler networks in a rubber matrix, the surface activity plays a key role by controlling polymer-filler phase bonding and inter-aggregate interactions. As shown in FIG. 1, at least four discrete surface sites where the polysulfide may be adsorbed may be present on the surface of the carbon black aggregates. The discrete surface sites include: (1) graphitic planes with $sp^2$ hybridization of carbon atoms; (2) amorphous carbon in an $sp^3$ hybridization; (3) edges of microcrystallites between adjacent graphitic planes; and (4) slit shaped pores defined by adjacent graphitic planes. Different grades of carbon black have aggregates with different distributions of sites (1) to (4), which depends largely on the manufacturing processes associated with the different grades.

The polysulfide interacts with, and is adsorbed at, at least a portion of the discrete surface sites of the carbon black aggregate, for example, as illustrated in FIGS. 2 and 3. The polysulfide adsorption may exist at discrete, spaced apart regions at the surfaces of the carbon black aggregates, leaving intervening regions uncovered. The level of adsorption may be evidenced by nitrogen surface area measurements (ASTM D6556), which are affected where the polysulfide covers the discrete adsorbent surface sites of the carbon black aggregates. As the polysulfide is adsorbed onto the surfaces of the carbon black aggregates, it is believed that the polysulfide also militates against adsorption of other materials at the same surfaces and thereby alters the detectable surface area.

For example, adsorption of the polysulfide on the surface of the carbon black aggregates may result in a depression in ASTM D6556 nitrogen adsorption of between about 0.1 percent and about 10 percent, more particularly about 1 percent to about 5 percent. In a particular embodiment, where N234 tread grade carbon black was tested as both non-treated (control) and treated, the control exhibited a nitrogen surface area of 116.3 $m^2/g$ and the treated carbon black product exhibited a lower nitrogen surface area of 113.6 $m^2/g$, or approximately a 2.3 percent decrease in measurable surface area.

The amount of sulfur adsorbed onto the carbon black from the chemical treatment may also be monitored by testing the sulfur content of the treated carbon black product by X-ray fluorescence or other elemental composition determination methods, as desired.

The treated carbon black product of present disclosure may include the polysulfide in an amount from about 0.1 percent to about 10 percent by weight of the carbon black aggregates, and likewise about 0.1 percent to about 10 percent of the pellet densified from an agglomeration of the carbon black aggregates. In more particular examples, the concentration of the polysulfide in the dried treated carbon black product is from about 0.5 percent to about 5 percent. In a most particular example, the polysulfide may be present in an amount of about 2.0 percent. One of ordinary skill in the art may select other suitable concentrations of the polysulfide in the treated carbon black product, as desired.

The polysulfide adsorbed onto the surfaces of the carbon black aggregates may include $S_x$, wherein x can be from 2 to 100. In most particular embodiments, the polysulfide includes at least one of $S_2$, $S_3$, $S_4$, $S_5$, and $S_6$. As nonlimiting examples, other suitable forms of polysulfide may include polysulfide salts such as alkali metal polysulfides, alkaline earth metal polysulfides, ammonium polysulfide, etc., and organic polysulfides. Where organic polysulfides are employed, the organic polysulfide may be selected so that it is semi-soluble in the aqueous solution. In a most particular embodiment, the carbon black aggregates are treated with an aqueous solution of a polysulfide salt such as sodium polysulfide or calcium polysulfide. Other suitable types of polysulfides may also be employed within the scope of the present disclosure.

The treated carbon black aggregates of the present disclosure may also be oxidized, for example, prior to treatment with the polysulfide. Carbon black generally includes small quantities of oxygen, hydrogen, nitrogen, and sulfur, on the surfaces of the carbon black aggregates. Oxidized carbon black may contain up to 15 percent of oxygen. It should be appreciated that oxidation of the carbon black product so as to have oxygen-containing functional groups at the surfaces of the carbon black aggregates may affect the interaction and adsorption of the polysulfide. The oxidation of the carbon black product may be performed by methods such as gaseous hydrogen peroxide, aqueous solutions of hydrogen peroxide, ozone treatment in a gaseous phase, and nitric acid in a liquid phase. A skilled artisan may select other suitable means for oxidizing the surfaces of the carbon black aggregates, as desired.

The present disclosure further includes a process for manufacturing the chemically treated carbon black product. In advantageous embodiments, the treated carbon black product is produced in the pelletizing portion of a typical carbon black process unit. The process may be a batch process, or a continuous process, as desired.

Figure 5:
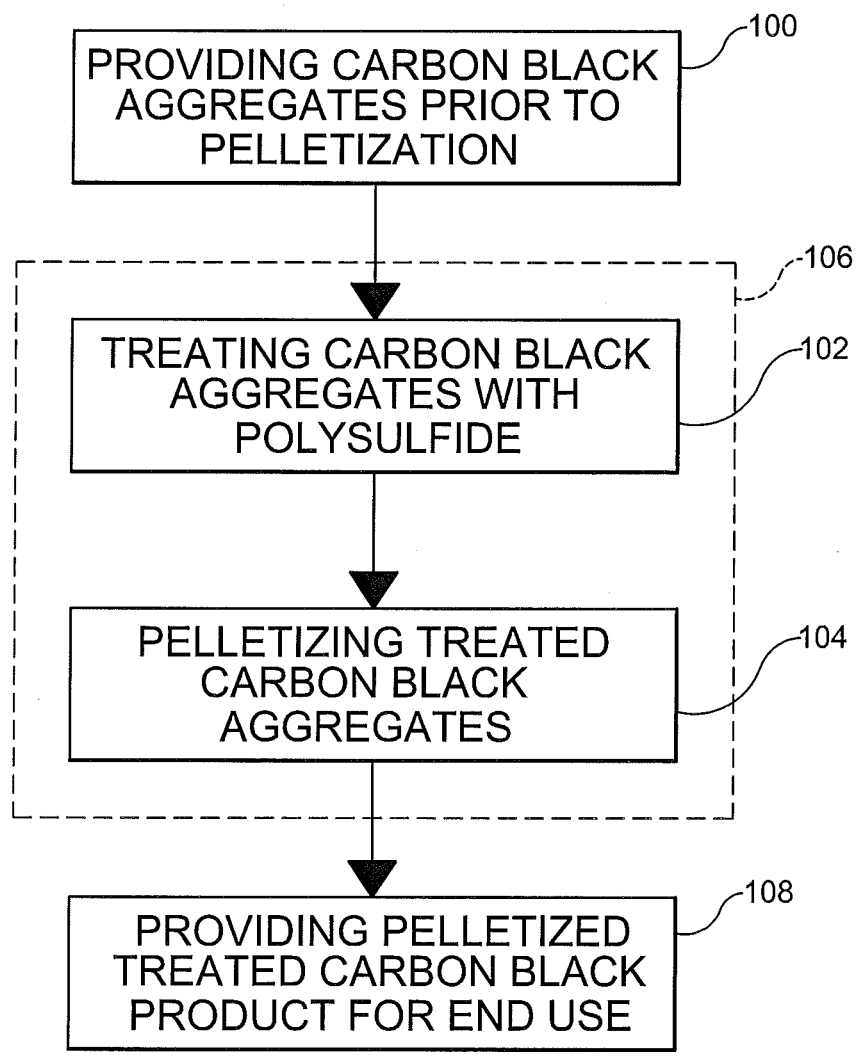
FIG. 5 is a flow diagram illustrating a method for manufacturing the treated carbon black product according to the present disclosure.

Referring to FIG. 5, an initial step 100 includes a provision of a quantity of the carbon black aggregates prior to pelletization. As a nonlimiting example, the carbon black aggregates may be provided according to a furnace process. However, other suitable methods for manufacturing the carbon black aggregates may be employed, as desired.

Where the carbon black aggregates are provided by the furnace process, it should be understood that very high temperatures are employed. Most chemical treatments are unable to withstand the elevated temperatures in the furnaces, and instead decompose at the elevated temperatures. For this reason, the method of the present disclosure is carried out as a post-treatment when the carbon black has already been formed, for example, by adding either water soluble or semi-soluble chemicals in the pelletization/densification process found in most typical carbon black process units.

In a post-treatment step 102 according to the disclosure, the carbon black aggregates, following their formation, are treated with a polysulfide. The polysulfide is adsorbed on the surfaces of the carbon black aggregates and provides the treated carbon black product, as described in greater detail hereinabove.

The method may further include a pelletization step 104, whereby the quantity of treated carbon black aggregates form pellets. Each pellet includes an agglomerated mass of carbon black aggregates densified in a generally spheroidal form.

In particularly advantageous embodiments, the treatment step and the pelletization are conducted simultaneously in a combined step 106. For example, in the combined step 106, the carbon black aggregates may be exposed to an aqueous solution of the polysulfide. In a typical production unit, where a continuous pelletizer is employed, the aqueous solution may be injected or pumped into a pelletizing drum at a predetermined rate. As examples, various grades of carbon black may require anywhere from 40-65% aqueous solution, and in particular the N234 treated grade carbon black typically requires approximately 60% aqueous in the combined treatment and pelletization. The total amount of the aqueous solution, and rate of introduction of the aqueous solution to the pelletizer, may be selected by the skilled artisan as desired.

It should be understood that the polysulfide in the aqueous solution may be ionic, permitting the polysulfide to be substantially dissolved in the aqueous solution. For example, the polysulfide may have counterions that are at least one of an alkali metal, an alkaline earth metal, a transition metal, and ammonium. In particular embodiments, the aqueous solution has a polysulfide salt such as sodium polysulfide or calcium polysulfide. Semi-soluble forms of organic polysulfides may also be used in the aqueous solution, as desired.

The concentration of the polysulfide in the aqueous solution is selected in order to provide from about 0.1 percent to about 10 percent by weight polysulfide on the dried treated carbon black product, and more particularly from about 0.5 percent to about 5 percent. Suitable concentrations of the polysulfide in the aqueous solution may be selected by the skilled artisan, as desired.

It should be appreciated that the aqueous solution may further include a binding agent for densification of the treated carbon black aggregates into the pellet. In certain examples, the binding agent is molasses. In other examples, the binding agent is a lignosulfonate. Other types of binding agents may also be employed within the scope of the present disclosure.

In alternative embodiments, where the polysulfide is provided in the form of the organic polysulfide, non-aqueous or organic solvents may be employed. Collection systems for the organic solvents would necessarily be employed in such embodiments.

Figure 4:
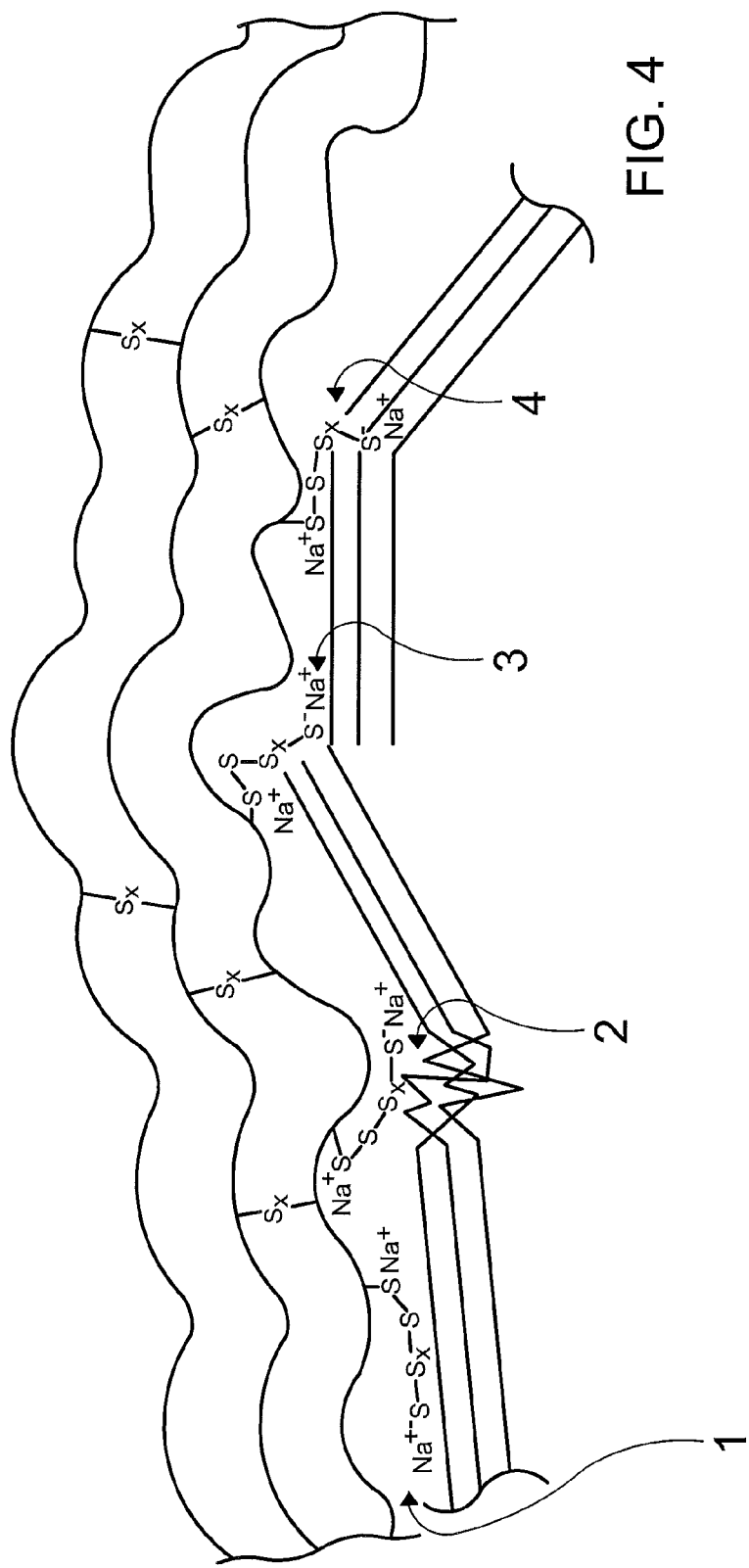
FIG. 4 illustrates an interaction of the treated carbon black aggregate shown in FIG. 2 with an elastomer, where the treated carbon black product compounded into an elastomeric composition according to a further embodiment of the present disclosure.

Following the formation of the pelletized treated carbon black product, the pelletized carbon black product is provided in a step 108 for an end use. In a most particular example, the end use is a compounding of the chemically treated carbon black into a performance enhanced rubber compound or elastomeric composition, for example, as depicted in FIG. 4. However, other uses of the treated carbon black product are also contemplated and should be considered within the scope of the disclosure.

The disclosed elastomeric composition includes an elastomer and the carbon black aggregates having the polysulfide adsorbed on surfaces thereof. As nonlimiting examples, the elastomer may include at least one of natural rubber, emulsion SBR, solution SBR, functional solution SBR, polybutadiene, polyisoprene, EPDM, nitrile, butyl, halogenated butyl, silicone rubber and any combination thereof. The carbon black aggregates, for example, in the pelletized form, may be mixed with the elastomer using conventional mixing techniques such as internal batch or banbury mixers. The treated carbon black product may be mixed with the elastomer using a single pass or multiple passes, for example. Other types of mixing techniques and systems may also be used.

The elastomeric composition further includes a cure package. The cure package may include at least one of sulfur and an accelerator. In other embodiments, the cure package includes a crosslinking agent other than sulfur. Activators such as stearic acid and zinc oxide, as particular nonlimiting examples, may also be used. The sulfur may be provided in the form of polymeric sulfur that is generally insoluble in unsaturated elastomers, for example. The sulfur may de-polymerize to soluble sulfur at temperatures associated with vulcanization or curing. The accelerator can be one of a primary accelerator and a second accelerator, for example. Suitable types of the primary accelerators may include sulfenamides (e.g., TBBS, CBS, etc.) and thiazoles (e.g., MBTS), as nonlimiting examples. Suitable types of second accelerators may include guanidines (e.g., DPG), thiurams (e.g., TMTD), dithiocarbamates, and dithiophosphates, as nonlimiting examples. One of ordinary skill in the art may select other suitable types of sulfur compounds and accelerator, as desired. Other ingredients, such as antioxidants and/or processing oils, may also be in the formulation as needed.

Where the polysulfide treated carbon black of the disclosure is employed, it should be understood that a skilled artisan may select a same concentration of sulfur/accelerator as if conventional carbon black were being used, or may change the concentration, as desired. For example, where the accelerator is sulfur-containing, an amount of the accelerator may be selected to account for the presence of the polysulfide adsorbed on the surfaces of the carbon black aggregates.

As a nonlimiting example, an effective amount of sulfur in each accelerator, for purposes of adjusting the concentration of the accelerator in the elastomeric composition, may be calculated from the following EQUATION.

$$\% \text{ S} = \frac{gs}{MW} \times 100$$

The EQUATION sums a total number of sulfur atoms present in the molecule and multiplies that number by the atomic mass for sulfur. The total mass of sulfur in the molecule is then divided by the molecular weight of the molecule, to provide a total amount of sulfur contributed to the elastomeric composition. It should be appreciated that the total amount of sulfur contributed to the elastomeric composition may be considered for purposes of adjusting the cure package when using the polysulfide treated carbon black.

Upon curing of the elastomeric composition, where unsaturated elastomers are employed, it should be appreciated that at least a portion of the polysulfide adsorbed to the surfaces of the carbon black aggregates may form crosslinks with the elastomer. The formation of crosslinks enhances an interaction between the treated carbon black product and the elastomer, contributing to desirable physical properties in the ultimate rubber product, such as a tire tread, formed with the elastomeric composition.

EXPERIMENTAL

The chemically treated carbon black according to the present disclosure has been evaluated in various rubber compounds and with a range of different accelerators as described herein, always compared to a non-treated carbon black control of the same grade.

The particular carbon black that was treated and used as an example herein is the ASTM grade N234, produced in a furnace process on an industrial scale reactor. The N234 carbon black example was treated with an aqueous sodium polysulfide solution, in a small scale batch pelletizer, to provide 2.0% sodium polysulfide treated carbon back product.

The carbon black was weighed and added to the batch pelletizer before the aqueous polysulfide solution was poured onto the carbon black in the pelletizer. The mix was allowed to soak for 60 seconds undisturbed before the 3 minute spin cycle (300 rpm) was started. The wet carbon black was transferred into a batch dryer. The dryer drum was rotating at relatively low rpm. The dryer setup was the following: burners stay on until a temperature of 400° F. was reached in the carbon black material. At this point, a timer started that would shut everything down after 10 minutes. The burners were also turned off once 400° F. was reached and would not turn back on until the temperature went below 390° F. This general process has been adapted to a commercial size unit using a continuous pelletizer with sodium polysulfide being continuously added at a concentration of 2.0% on the carbon black using commercial N234 and drying using a commercial dryer at temperatures below 400° F.

Initially, the treated carbon black was evaluated in the ASTM standard formulation for SBR based compounds, D3191. The ingredients for this particular formula are illustrated in TABLE 1.

TABLE 1

Relative quantities and ingredients for D3191 rubber compounds.

| Ingredients | Weight (g) | Curatives (g) |
| --- | --- | --- |
| Polymer | 100 | 0 |
| Carbon Black | 50 | 0 |
| Zinc Oxide | 3 | 0 |
| Stearic Acid | 1 | 0 |
| Sulfur | 0 | 1.75 |
| TBBS | 0 | 1 |

The chemically treated carbon black was evaluated in ASTM standard formulation for natural rubber containing compounds, D3192. The standard formulation in natural rubber is shown in TABLE 2. This formula was also used as a benchmark for evaluating chemically treated carbon black with a variety of different cure packages.

TABLE 2

Relative quantities and ingredients for D3192 rubber compounds.

| Ingredients | Weight (g) | Curatives (g) |
| --- | --- | --- |
| Polymer | 100 | 0 |
| Carbon Black | 50 | 0 |
| Zinc Oxide | 5 | 0 |
| Stearic Acid | 3 | 0 |
| Sulfur | 0 | 2.5 |
| MBTS | 0 | 0.6 |

The treated carbon black was also evaluated in a model passenger tread formulation containing a blend of SBR and BR in a ratio of 75:25. The ingredients for this particular model formulation are show in TABLE 3.

TABLE 3

Relative quantities and ingredients for a model passenger tread compound.

| Ingredients | Weight (g) | Curatives (g) |
| --- | --- | --- |
| Polymer (SBR:BR Blend) | 100 | 0 |
| Carbon Black | 70 | 0 |
| Zinc Oxide | 3 | |
| Stearic Acid | 2 | |
| Oil | 37.5 | |
| Sulfur | | 1.8 |
| CBS | | 1.2 |
| DPG | | 0.1 |

The treated carbon black was also evaluated in a model formula containing a blend of NR and BR mixed in a ratio of 1:1. The ingredients for this particular model formula are shown in TABLE 4.

TABLE 4

Relative quantities and ingredients for formula containing NR & BR.

| Ingredients | Weight (g) | Curatives (g) |
| --- | --- | --- |
| Polymer (NR:BR Blend) | 100 | 0 |
| Carbon Black | 50 | |
| Zinc Oxide | 5 | |
| Stearic Acid | 2 | |
| Sulfur | | 1 |
| TBBS | | 0.9 |

The orthogonality of polysulfide treated carbon black was evaluated by using a variety of accelerators substituted for MBTS in D3192. It was determined the most appropriate approach would be to use equal amounts of sulfur stemming from the accelerator, i.e., the amount of accelerator would be the only variable in the elastomeric composition to compensate for higher or lower sulfur containing accelerators.

Results and Discussion:

Data collected along with calculations show that chemically treated carbon black is a viable product and that polysulfide treated carbon black can be produced effectively. The major benefit of using the chemically treated carbon black is the reduction in hysteresis that directly correlates to improved fuel consumption. Herein, the performance improvement was demonstrated as being obtained by using a sodium polysulfide treated carbon black compared to a non-treated carbon black of the same grade.

D3191:

The initial evaluation of chemically treated carbon black was carried out in a SBR based formula (ASTM D3191). The results can be seen in TABLE 5. Although elongation and durometer results are essentially identical, modulus and tensile are slightly lower. However, when analyzing the hysteresis data, it is clear that a significant improvement can be obtained in this formulation. Tangent delta is decreased by approximately 14%, but G" is lowered by more than 30% for the sodium polysulfide treated N234 compared to a non-treated control.

TABLE 5

Rubber properties for non-treated N234 versus sodium polysulfide treated N234 in D3191.

| | N234 Control | N234 Treated | % vs. Control |
| --- | --- | --- | --- |
| Stress-Strain (Cure @ 145° C.) | | | |
| 100% Modulus, MPa | 3.47 | 2.96 | 85% |
| 200% Modulus, MPa | 10.11 | 8.27 | 82% |
| 300% Modulus, MPa | 19.29 | 16.74 | 87% |
| Tensile, MPa | 27.15 | 25.24 | 93% |

TABLE 5-continued

Rubber properties for non-treated N234 versus
sodium polysulfide treated N234 in D3191.

|  | N234 Control | N234 Treated | % vs. Control |
|---|---|---|---|
| Elongation, % | 396 | 400 | 101% |
| Durometer | 74 | 73 | 99% |
| Rheometrics SS @ 30° C. | | | |
| G' max, MPa | 10.7 | 7.77 | 72% |
| G" max, MPa | 2.64 | 1.76 | 67% |
| Tan δ max | 0.348 | 0.299 | 86% |

D3192:

Even more promising results are observed when sodium polysulfide treated N234 is compared to non-treated N234 in the D3192 natural elastomeric composition. Results are illustrated in TABLE 6. In this rubber compound, the strength of the final product is close to the control sample as seen by the modulus, tensile, elongation, and durometer. The major improvement for this natural rubber based formulation is seen in the hysteresis data. Tangent delta is lowered by approximately 15%, but a significant decrease is seen in G". The lowering of G" is by almost 50% for the chemically treated carbon black versus the control sample. Abrasion data illustrates an equivalent resistance to wear when the treated carbon black is compared to a non-treated control.

TABLE 6

Rubber properties for non-treated N234 versus
sodium polysulfide treated N234 in D3192.

|  | N234 Control | N234 Treated | % vs. Control |
|---|---|---|---|
| Stress-Strain (Cure @ 145° C.) | | | |
| 100% Modulus, MPa | 3.0 | 3.0 | 100% |
| 200% Modulus, MPa | 8.0 | 7.7 | 96% |
| 300% Modulus, MPa | 14.7 | 13.8 | 94% |
| Tensile, MPa | 25.0 | 23.6 | 94% |
| Elongation, % | 458 | 458 | 100% |
| Durometer | 72 | 71 | 99% |
| Rheometrics SS @ 30° C. | | | |
| G' max, MPa | 12.4 | 7.10 | 57% |
| G" max, MPa | 2.33 | 1.18 | 51% |
| Tan δ max | 0.307 | 0.262 | 85% |
| Angle Abrasion (% loss), 4000 rev. | 10.6% | 10.7% | 99% |

The polysulfide treated carbon black was also evaluated in the model passenger tread formulation with a blend of SBR and BR. In this particular formula the chemical treatment illustrates a similar trend to the previous two in an 18% drop in G" and a 12% drop in tangent delta as seen in TABLE 7. A slight difference is in the increase in modulus and decrease in elongation with equivalent tensile and durometer. Abrasion resistance when measuring the mass loss from abrading samples on a stone wheel shows that the polysulfide treated carbon black is superior when compared to a non-treated control.

TABLE 7

Rubber properties for non-treated N234 versus
sodium polysulfide treated N234 in a model passenger
tread formulation (SBR:BR blend).

|  | N234 Control | N234 Treated | % vs. Control |
|---|---|---|---|
| Stress-Strain (Cure @ 145° C.) | | | |
| 100% Modulus, MPa | 1.6 | 1.9 | 119% |
| 200% Modulus, MPa | 3.6 | 4.8 | 133% |
| 300% Modulus, MPa | 7.0 | 9.3 | 133% |
| Tensile, MPa | 18.1 | 18.4 | 102% |
| Elongation, % | 598 | 498 | 83% |
| Durometer | 63 | 64 | 102% |
| Rheometrics SS @ 60° C. | | | |
| G' max, MPa | 4.525 | 3.898 | 86% |
| G" max, MPa | 0.906 | 0.722 | 80% |
| Tan δ max | 0.326 | 0.286 | 88% |
| Angle Abrasion (g lost), 8000 rev. | 9.52 | 8.88 | 107% |

The elastomeric composition based on a blend of BR and NR illustrates a similar trend to the previous elastomeric formulations used to evaluate the sodium polysulfide treated carbon black. Modulus is slightly elevated, whereas elongation is slightly depressed with equivalent tensile and durometer. In this particular formula an almost 10% reduction is seen in G" while G' shows essentially no loss. The equivalent G' and the loss in G" results in approximately an 11% decrease in tangent delta. The treated carbon black outperforms the non-treated carbon black control when comparing the abrasion resistance data by almost 20% as seen in TABLE 8.

TABLE 8

Rubber properties for non-treated N234 versus sodium
polysulfide treated N234 in a NR:BR blend (1:1).

|  | N234 Control | N234 Treated | % vs. Control |
|---|---|---|---|
| Stress-Strain (Cure @ 145° C.) | | | |
| 100% Modulus, MPa | 1.7 | 2.0 | 118% |
| 200% Modulus, MPa | 4.2 | 5.0 | 119% |
| 300% Modulus, MPa | 8.8 | 10.4 | 118% |
| Tensile, MPa | 25.9 | 26.1 | 101% |
| Elongation, % | 623 | 566 | 91% |
| Durometer | 63 | 64 | 102% |
| Rheometrics SS @ 60° C. | | | |
| G' max, MPa | 3.286 | 3.265 | 99% |
| G" max, MPa | 0.477 | 0.441 | 92% |
| Tan δ max | 0.205 | 0.182 | 89% |
| Angle Abrasion (g lost), 12000 rev. | 3.60 | 3.03 | 119% |

D3192—Varying the Accelerator:

The success observed in the previous experiments in lowering the heat buildup using a chemical treatment of sodium polysulfide on the carbon black led us to evaluate various accelerators in a natural rubber formula. D3192 was chosen as the formula for such an evaluation, and it is clear that the accelerator type greatly affect the outcome. As noted before in the D3192 formulation, MBTS does reduce G" significantly, but if one switches from thiazole derivatives to thiuram type accelerators an even greater reduction is observed for the sodium polysulfide treated N234 compared to non-treated N234. Results from the evaluation of various accelerators are illustrated in TABLE 9.

TABLE 9

Reduction in G" max, Pa for sodium polysulfide treated N234 compared to non-treated N234 in D3192 with varying the accelerator.

| Accelerator | N234 Control | N234 Treated | % vs. Control |
|---|---|---|---|
| MBTS | 2.33E+06 | 1.18E+06 | 51% |
| CBS  | 2.14E+06 | 1.10E+06 | 52% |
| OBTS | 1.71E+06 | 1.06E+06 | 62% |
| TBBS | 3.01E+06 | 1.38E+06 | 46% |
| MBT  | 2.86E+06 | 1.88E+06 | 66% |
| TMTM | 5.62E+06 | 1.14E+06 | 20% |
| TMTD | 3.71E+06 | 1.38E+06 | 94% |

A polysulfide treated carbon black has been developed, manufactured on a pilot unit as well as on a commercial size unit, and evaluated in various rubber compounds. The treated carbon black product has been shown to be compatible with a wide range of elastomeric compositions, especially natural rubber containing compounds. Advantageously, the treated carbon black provides a significant improvement in hysteresis across the board with equivalent or better abrasion resistance and with little effect on other rubber properties. It is also believed that strategic and careful compounding as described hereinabove permits one to fully obtain the effects of the benefits provided from a sodium polysulfide treated carbon black according to the present disclosure.

While certain representative embodiments and details have been shown for purposes of illustrating the invention, it will be apparent to those skilled in the art that various changes may be made without departing from the scope of the disclosure, which is further described in the following appended claims.

What is claimed is:

1. A treated carbon black product, comprising:
    carbon black aggregates having non-organic polysulfide salt adsorbed on surfaces thereof, wherein the non-organic polysulfide salt is adsorbed on a fraction of the surfaces of the carbon black aggregates, and the non-organic polysulfide salt exists at discrete, spaced apart regions at the surfaces of the aggregates.

2. The treated carbon black product of claim 1, wherein the carbon black aggregates are in the form of a pellet including an agglomerated mass of the carbon black aggregates.

3. The treated carbon black product of claim 2, wherein the non-organic polysulfide salt is evenly distributed throughout the pellet.

4. The treated carbon black product of claim 1, wherein the non-organic polysulfide salt is present in an amount from about 0.1% to about 10% by weight of the aggregate.

5. The treated carbon black product of claim 1, wherein the non-organic polysulfide salt includes $S_x$, with x being from 2 to 100.

6. A treated carbon black product, comprising:
    carbon black aggregates having non-organic polysulfide salt adsorbed on surfaces thereof, wherein the surfaces of the carbon black aggregates are also oxidized.

7. The treated carbon black product of claim 1, wherein adsorption of the non-organic polysulfide salt on the surface of the carbon black aggregates results in a depression in ASTM D6556 nitrogen adsorption of between about 0.1 percent and about 10 percent.

8. An elastomeric composition, comprising:
    an elastomer; and
    carbon black aggregates having non-organic polysulfide salt adsorbed on surfaces thereof.

9. The elastomeric composition of claim 8, wherein the elastomer is selected from a group consisting of natural rubber, emulsion SBR, solution SBR, functional solution SBR, polybutadiene, polyisoprene, EPDM, nitrile, butyl, halogenated butyl, silicone rubber and any combination thereof.

10. The elastomeric composition of claim 8, further comprising a cure package including at least one of sulfur and an accelerator.

11. The elastomeric composition of claim 10, wherein the accelerator is sulfur-containing and an amount of the accelerator is selected to account for the presence of the non-organic polysulfide salt adsorbed on the surfaces of the carbon black aggregates.

* * * * *